(12) United States Patent
Takaoku et al.

(10) Patent No.: US 10,190,555 B2
(45) Date of Patent: Jan. 29, 2019

(54) ELECTROMAGNETIC VALVE (71) Applicant: Hitachi Automotive Systems, Ltd., Hitachinaka-shi, Ibaraki (JP)

(72) Inventors: Atsushi Takaoku, Hitachinaka (JP); Yuta Yanagisawa, Hitachinaka (JP); Kiyotaka Ogura, Hitachinaka (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 47 days.

(21) Appl. No.: 15/125,261

(22) PCT Filed: Jan. 16, 2015

(86) PCT No.: PCT/JP2015/051001
§ 371 (c)(1),
(2) Date: Sep. 12, 2016

(87) PCT Pub. No.: WO2015/136974
PCT Pub. Date: Sep. 17, 2015

(65) Prior Publication Data
US 2017/0074222 A1    Mar. 16, 2017

(30) Foreign Application Priority Data
Mar. 14, 2014    (JP) .................................. 2014-050977

(51) Int. Cl.
*F16K 31/06*    (2006.01)
*F02M 51/06*    (2006.01)
*F16K 1/12*    (2006.01)

(52) U.S. Cl.
CPC ........... *F02M 51/0671* (2013.01); *F16K 1/12* (2013.01); *F16K 31/0675* (2013.01);
(Continued)

(58) Field of Classification Search
CPC ............. F16K 31/0655; F16K 31/0651; H01F 2007/086; H01F 2007/1676;
(Continued)

(56) References Cited

U.S. PATENT DOCUMENTS 8,991,783 B2 * 3/2015 Abe ................... F02M 51/0653
                                                              239/533.11
9,291,135 B2 * 3/2016 Ohwada ............. F02M 51/0614
(Continued)

FOREIGN PATENT DOCUMENTS

EP    2 325 473 A1    5/2011
EP    2 492 488 A1    8/2012
(Continued)

OTHER PUBLICATIONS

Japanese-language Office Action issued in counterpart Japanese Application No. 2016-507382 dated May 30, 2017 with English translation (7 pages).
(Continued)

*Primary Examiner* — Matthew W Jellett
(74) *Attorney, Agent, or Firm* — Crowell & Moring LLP

(57) ABSTRACT

It is important not to form the partial bump in the collision structural part, however the fixed core and the movable core are relatively inclined due to an accumulation of tolerances and therefore even if each collision structural part of the fixed core and the movable core in formed in a flat shape, the fixed core and the movable core are contacted with not the whole of the collision structural parts but a part of the collision structural parts at the moment of the collision. In a case in which the collision structural part is formed in a ring shape or an intermittent ring shape, the fixed core and the movable core are contacted with each other at outer peripheral parts. Thus, when the fixed core and the movable core are collided with each other, a high stress is applied to the
(Continued)

OVERALL VIEW OF FUEL INJECTION VALVE

PARTIAL CROSS-SECTIONAL VIEW 2 outer peripheral parts contacted first. Accordingly, the shape of the outer peripheral parts of the collision structural parts is important, however since such a part, which is a tiny protruding shape, requires high processing accuracy, to reduce stress occurred during collision while keeping productivity is difficult. In the present invention, an R-shaped part and a flat part are provided in order from an outer peripheral side of a collision structural part. Further, the R-shaped part and the flat part are connected in a tangent manner.

8 Claims, 9 Drawing Sheets

(52) U.S. Cl.
CPC ..... *F02M 2200/02* (2013.01); *F02M 2200/03* (2013.01); *F02M 2200/08* (2013.01); *F02M 2200/9038* (2013.01); *F02M 2200/9061* (2013.01)

(58) Field of Classification Search
CPC ....... F02M 2200/9061; F02M 2200/90; F02M 2200/02; F02M 51/0653
USPC ..................................................... 251/129.16
See application file for complete search history.

(56) References Cited

U.S. PATENT DOCUMENTS

| 2011/0155103 A1 | 6/2011 | Abe et al. |
| 2012/0204839 A1 | 8/2012 | Ohwada et al. |

FOREIGN PATENT DOCUMENTS

| JP | 8-506876 | | 7/1996 |
| JP | 9-82707 | A | 3/1997 |
| JP | 10-326971 | A | 12/1998 |
| JP | 2005-36696 | A | 2/2005 |
| JP | 2007-205229 | A | 8/2007 |
| JP | 2010-71123 | A | 4/2010 |
| JP | 2011-89432 | A | 5/2011 |
| JP | 2012-246789 | A | 12/2012 |

OTHER PUBLICATIONS

International Search Report (PCT/ISA/210) issued in PCT Application No. PCT/JP2015/051001 dated Mar. 24, 2015 with English translation (Four (4) pages).
Japanese-language Written Opinion (PCT/ISA/237) issued in PCT Application No. PCT/JP2015/051001 dated Mar. 24, 2015 (Five (5) pages).
Extended European Search Report issued in counterpart European Application No. 15762308.3 dated Nov. 23, 2017 (Five (5) pages).

* cited by examiner

FIG. 1
OVERALL VIEW OF FUEL INJECTION VALVE

FIG. 2
PARTIAL CROSS-SECTIONAL VIEW 1

FIG. 4
PARTIAL CROSS-SECTIONAL VIEW 3

FIG. 5
RELATIONSHIP BETWEEN SIZE OF R-SHAPE AND STRESS

FIG. 6A

PARTIAL CROSS-SECTIONAL VIEW 4

FIG. 6C

PARTIAL CROSS-SECTIONAL VIEW 6

ELECTROMAGNETIC VALVE

TECHNICAL FIELD

The present invention relates to a solenoid type electromagnetic valve.

BACKGROUND ART

In an electromagnetic type fuel injection valve used in an internal combustion engine, in particular, a cylinder injection system for vehicle using gasoline, in order to satisfy the regulation or the demand with respect to exhaust gas or fuel consumption, there has been an increasing market demand for injecting fuel into an engine cylinder at a higher pressure compared to a conventional way of injecting. It is because the injection speed of fuel is increased and frictional, resistance between air and fuel becomes larger as the fuel pressure becomes higher, and therefore the fuel is further atomized, as a result, a combustion property is improved.

The electromagnetic type fuel injection valve is formed as a solenoid type valve which opens the valve, by attracting movable core formed as a movable iron core by a magnetic attraction force toward a fixed core formed as a fixed iron core to be collided with each other. In order to inject fuel at a high fuel pressure, large force to be applied to a valve body against the fuel pressure is required for opening the valve. Thus, impact load applied to a collision structural part of the fixed core and the movable core becomes larger compared to a conventional valve. In order to reduce wear and deformation of the collision structural part due to the load in colliding, a surface treatment with high strength is applied to the collision structural part.

Further, the collision structural part is a part of a magnetic circuit for generating the magnetic attraction force. It is preferable that facing surfaces of the fixed core and the movable core are arranged to be close in order to increase the magnetic attraction force. On the other hand, in order to improve a response property, it is preferable to enlarge each facing surface of the fixed core and the movable core. It is because the response property is improved by decreasing squeezing force as adhering force of liquid and increasing a closing valve speed. Thus, as described in JP 2011-89432 A, it is preferable to form a projection with small width and height on the facing surface of the fixed core or the movable core which are provided as the collision structural part, and therefore high processing accuracy is required because of its small shape.

Here, a thickness of the surface treatment might be uneven. When a partial projection is formed because of variation in thickness of the collision structural part, a stress concentration is occurred and therefore the wear is promoted.

In particular, in a case in which electroplating is used as the surface treatment, since magnetic flux density is uneven due to a shape of an object to be electroplated, the thickness of the surface treatment is apt to become uneven. Accordingly, in a conventional technique as described in JP 2011-89432 A, a taper is formed in advance on a base material to be electroplated.

When the wear and the deformation of the collision structural part become large, a stroke of the valve body becomes larger, a passage section becomes larger. This configuration leads to an increase of an injection amount and a decrease of the fuel consumption and the combustion property.

CITATION LIST

Patent Literature

PTL 1: JP 2011-89432 A
PTL 2: JP 2010-71123 A

SUMMARY OF INVENTION

Technical Problem

It is important not to form the projection on the collision structural part, however the fixed core and the movable core are relatively inclined due to an accumulation of tolerances and therefore even if each collision structural part the fixed core and the movable core is formed in a flat shape, the fixed core and the movable core are contacted with not the whole of the collision structural parts but a part of the collision structural parts at the moment of the collision. In a case in which the collision structural part is formed in a ring shape or an intermittent ring shape, the fixed core and the movable core are contacted with each other at outer peripheral parts. Thus, when the fixed core and the movable core are collided with each other, a high stress is applied to the outer peripheral parts contacted first. Accordingly, the shape of the outer peripheral parts of the collision structural parts is important, however since such a part, which is a tiny protruding shape, requires high processing accuracy, to suppress the wear and the deformation of the collision structural part under a large collision load compared to the conventional one while keeping productivity is difficult.

In the conventional technique as described in JP 2011-89432 A, a taper is provided in order not to form the partial projection on the collision structural parts, and therefore the high stress concentration is avoided. However, an outer peripheral part is formed in an edge shape, and as a result, the stress is concentrated on the outer peripheral part.

In another conventional technique as shown in FIG. 7 of JP 2010-71123 A, a combination of a taper, a flat part forming the collision structural part, and a taper which are arranged in order from an outer diameter side toward an inner diameter side is disclosed. Also in this case, as described above, in a case in which a thickness of the surface treatment becomes uneven, a stress concentration is occurred on a partial projection formed due to variation in thickness of the collision structural part, or on an outer peripheral part of the flat part forming the collision structural part.

Solution to Problem

In the present invention, an R-shaped part and a flat, part are provided in order from an outer peripheral side of a collision structural part. Further, the R-shaped part and the flat part are connected in a tangent manner.

Advantageous Effects of Invention

According to the present invention, by reducing stress occurred on the collision structural part, wear and deformation can be suppressed by a high productive method.

DESCRIPTION OF EMBODIMENTS

The whole configuration of embodiments is described with reference to FIG. 1. Other figures are illustrated for explanation by exaggerating in dimensions and therefore it is different from the actual scale.

Figure 1:
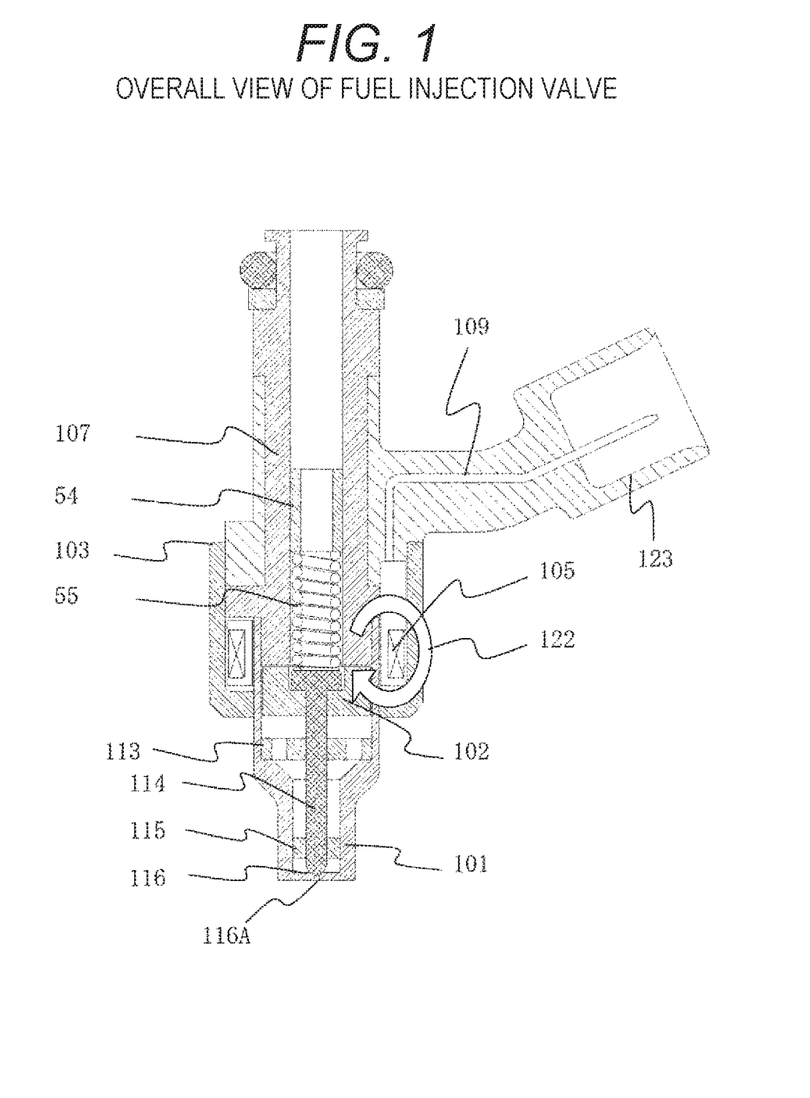
FIG. 1 is a cross-sectional view of the whole of a fuel injection valve according to the present invention.

A high pressure pump, which is not shown, for pressurizing and providing fuel, and a piping connecting the high pressure pump and an upper part of a fixed core 107 are arranged above the fixed core 107 in FIG. 1, and the fuel is pressurized and provided to a through hole as a fuel passage formed at the center part of the fixed core 107. A receiving surface for a spring 55 is provided on an upper end surface of a valve body 114.

An adjustment element 54 is contacted with an upper end surface, which is a side opposite to the valve body 114, of the spring 55. The adjustment element 54 is fixed on the fixed core 107.

The valve body 114 is held by a guide member 115 and a movable element guide 113 in a reciprocatingly movable manner in a vertical direction.

In a valve closed, state in which an electromagnetic coil 105 is not energized, the valve body 114 is contacted with a fixed valve 115 arranged at a distal end of a nozzle 101 by biasing force of the spring 55, and therefore fuel provided from the high pressure pump is prevented from flowing from a fuel injection hole 116A.

The electromagnetic coil 105 is arranged at an outer peripheral part of the fixed core 107, and a toroidal magnetic path shown by an arrow 122 passing through a movable core 102 formed integrally with a housing 103, the nozzle 101 and the valve body 114 is formed. Further, a plug which provides electricity from a battery is connected to a connector 123 formed at a tip end part of a conductor 109. Energizing state and non-energizing state of the electromagnetic coil 105 is controlled by a controller not shown via the conductor 109.

When the electromagnetic coil 105 is being energized, a magnetic attraction force is generated between the movable core 102 and the fixed core 107 by a magnetic flux passing through a magnetic path 122. The movable core 102 is attracted and moved upwardly by its stroke amount to collide with a lower end surface of the fixed core 107.

As a result, the valve body 114 is separated from the fixed valve 116 by the stroke amount and turned into a valve opened state, and then the fuel provided from the through hole as the fuel passage formed at the center part of the fixed core 107 is injected into a combustion chamber from the injection hole 116A.

When energizing the electromagnetic coil 105 is cancelled, the magnetic flux in the magnetic path 122 is disappeared and the magnetic attraction force is disappeared as well. In this state, spring force of the spring 55 which presses the valve body 114 in a valve closing direction is applied to the valve body 114. As a result, the valve body 114 is pressed and returned to a valve closed position in which the valve body 114 is contacted with the fixed valve 116.

A first embodiment is described with reference to FIGS. 2 and 3.

Figure 2:
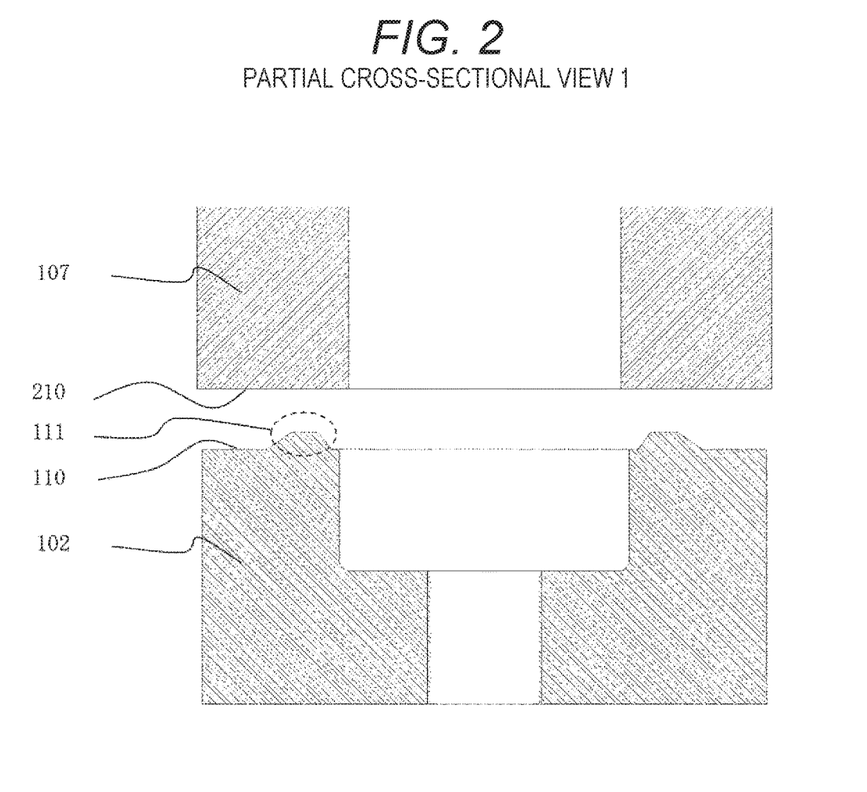
FIG. 2 is a partial cross-sectional view 1.

As shown in FIG. 2, the fixed core and the movable core respectively have a ring shaped end surface 110 and end surface 210 facing each other. A projection 111, which is contacted with the fixed core end surface 210 in colliding, is provided on the movable core end surface 110. The fixed core and the movable core are collided with each other in valve opening and therefore the end surface 210 and the projection 111 are contacted with each other.

When the end surface 110 and the end surface 210 are contacted with each other in liquid, a valve closing time is extended because squeezing force defined by adhering force of the liquid is generated and therefore a response property is deteriorated. Thus, a contact area is narrowed as much as possible by providing the projection 111 and generation of the squeezing force is suppressed.

Further, in a case in which the end surface 210 and a part of the end surface 110 other than the projection 111 is too close, the squeezing force is also generated. On the other hand, since the end surface 210 and the end surface 110 form a part of a magnetic circuit, in a case in which both end surfaces are remote to each other, the magnetic attraction force is decreased and therefore the response property is deteriorated in valve opening. Accordingly, height of the projection 111 is set to keep a balance between the squeezing force and the magnetic attraction force. Specifically, the height of the projection 111 is set to an extremely small height of 20 to 40 μm.

Figure 3:
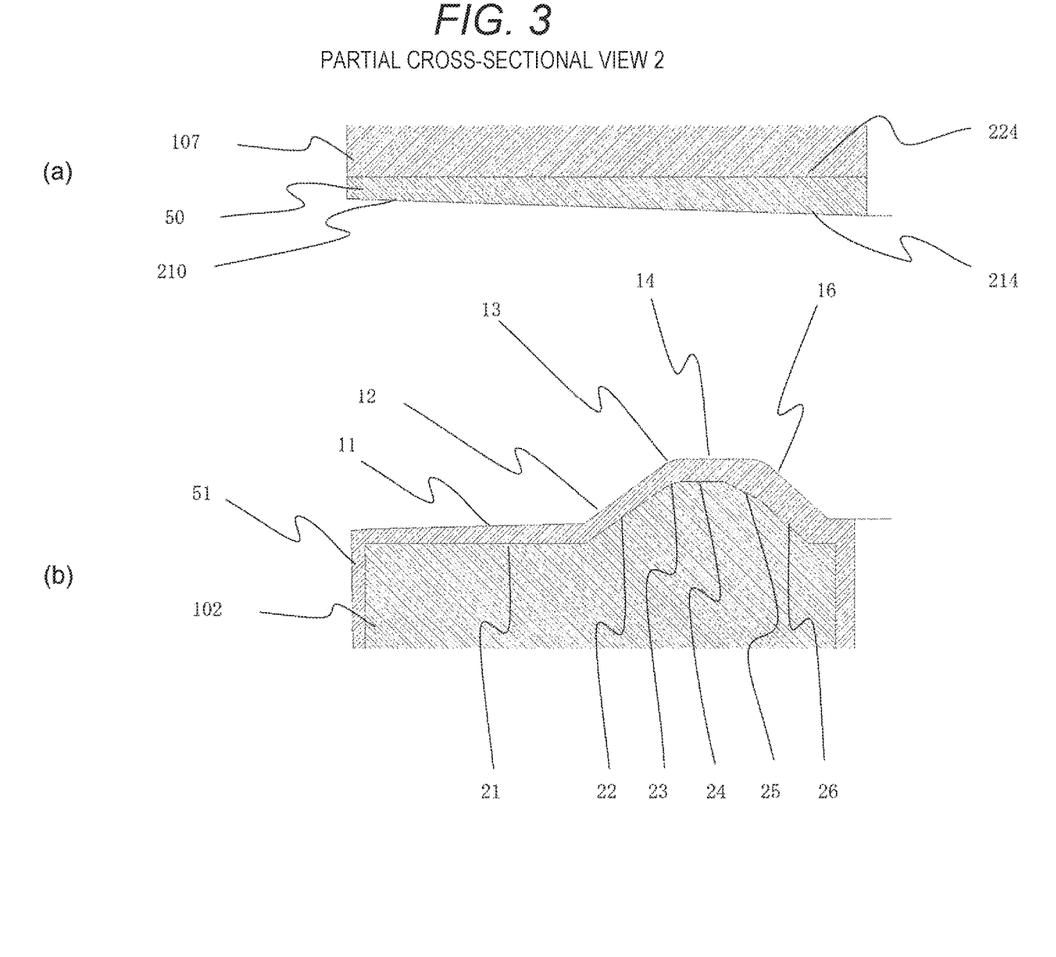
FIG. 3 is a partial cross-sectional view 2.

FIG. 3 is an enlarged view of a part of the end surface 110 and the end surface 210. FIG. 3 shows left half parts with respect to the center of the fixed core and the movable core defined in a right side in FIG. 3. A hard chrome plating 50 as a surface treatment with hard rigidness is applied to the fixed core end surface 210 in order to suppress the wear and the deformation due to collision. A flat surface 224 is provided on a base material to which the plating 50 is applied. A flat surface 214 as a part of the fixed core end surface 210 is collided with the projection 111 of the movable core. The plating 50 is defined by an electroplating, and a thickness of the plating layer becomes uneven due to unevenness of magnetic flux density caused by a base material shape or an electrode shape. In the present embodiment, the magnetic flux density is adjusted such that a plating thickness distribution becomes larger toward the center of the core in order to form the plating on a facing part 214 of a projection part 110 as a collision part to be thick.

A hard chrome plating 51 is applied to the movable core end surface 110 in order to suppress the wear and the deformation due to collision. A base material to which the plating 51 is applied has an outer peripheral flat part 21, an outer peripheral taper part 22, an R-shaped part 23, a flat part 24, and an inner peripheral taper part 25. A taper part 26, which is further inclined at a larger angle, is provided at an inner diameter side of the inner peripheral taper part 25 in order to allow the projection part 111 to escape. A connecting part of the R-shaped part 23 and a connecting part of the flat part 24 are connected in a tangent manner. Similar to the fixed core, the plating 51 is defined by an electroplating, and a thickness of the plating layer becomes uneven due to unevenness of magnetic flux density caused by a base material shape or an electrode shape. In the present embodiment, the magnetic flux density is adjusted such that a plating thickness distribution becomes larger toward the center of the core in order to form the plating on a projection part as a collision part to be thick.

After the movable core end surface 110 is plated, the movable core end surface 110 with the plating has an outer peripheral flat part 11, an outer peripheral taper part 12, an R-shaped part 13, a flat part 14, and an inner peripheral taper part 16 in order from its outer peripheral side due to the base material shape and the plating thickness distribution. A connecting part of the R-shaped part 13 and a connecting part of the flat part 14 are connected in a tangent manner. Further, since the plating thickness becomes larger toward the inner diameter side, the flat part 14 is formed by the inner diameter side taper 25 as a result of plating.

Figure 4:
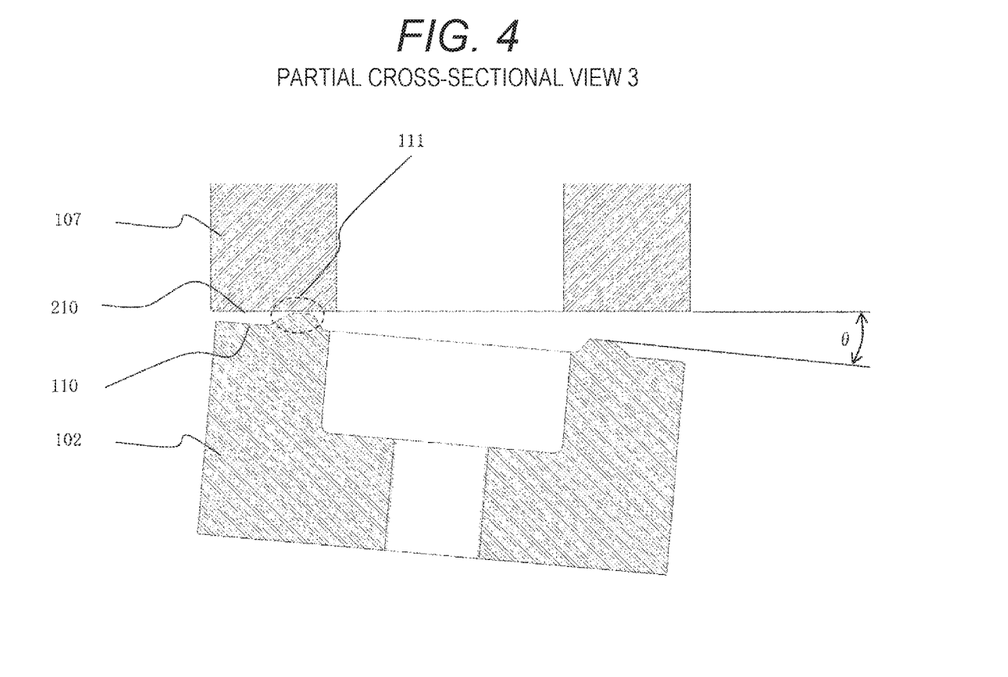
FIG. 4 is a partial cross-sectional view 3.

FIG. 4 is a martial cross-sectional view of the fixed core and the movable core in which the fl wed core and the movable core are inclined. At the moment of collision of the fixed core and the movable core after the valve opening, the movable core may be inclined at angle θ relatively against, the fixed core due to clearance of a sliding part or other component accuracy. At this time, since a contact area is decreased compared to a case in which the inclined angle θ is equal to 0 degree and the fixed core and the movable core are contacted with each other in a parallel manner, even if the same impact load is generated, stress generated on the contact part becomes larger.

Further, contact part in colliding of the fixed core and the movable core at angle θ is the R-shaped part 13 of the movable core. Thus, the generated stress becomes smaller as a size of R-shape of the R-shaped part 13 becomes larger. Since the R-shaped part 13 and the flat part 14 are connected in a tangent manner, even if the inclined angle θ is small, the movable core is contacted at a curved surface of the R-shaped part 13.

As described above, the height of the projection part 111 is extremely small, and therefore even if a high accuracy processing is performed, shape change is easily occurred due to variation in processing. The flat 24 formed between the R-shaped part 23 and the inner peripheral taper 25 defined by the base material shape of the projection part 111 is set to be larger than a shift amount of the inner diameter taper 25 caused by variation in processing. Even if the inner peripheral taper 25 is shifted in a radius direction (a lateral direction in the figure) due to the variation in processing, the connecting parts of the R-shaped part 23 and the flat 24 can be remained.

Figure 5:
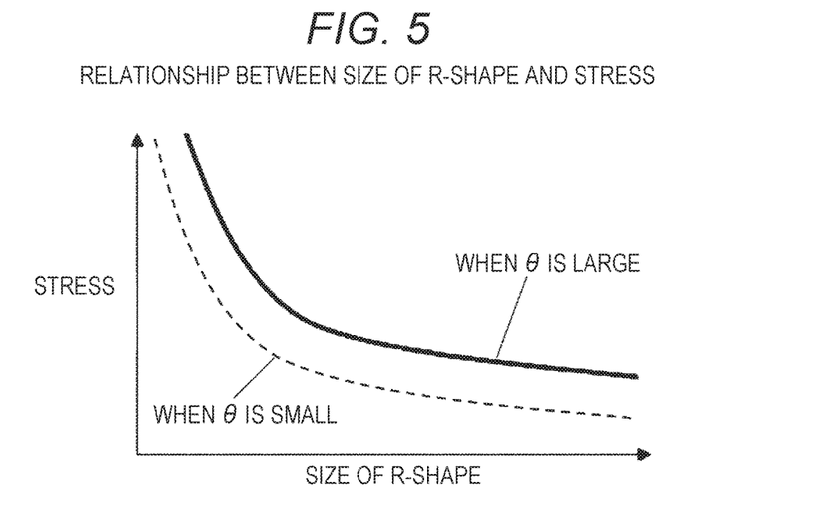
FIG. 5 shows a relationship between size of R-shape and stress.

FIG. 5 shows a size of the R-shape of the R-shaped part 13 and stress occurred on the contact part in colliding at inclined angle θ. The occurred stress becomes larger as the size of the R-shape becomes smaller and the incline angle becomes larger.

In the connecting parts of the R-shaped part 13 and the outer peripheral side taper 12, the width of the R-shaped part 13 and the inclined angle of the outer peripheral side taper 12 are set such that the fixed core is contacted with the R-shaped part 13 in a case in which the inclined angle θ becomes the maximum.

The flat 24 is formed to have a small width such that a stepped part or an inclined part due to a plating thickness distribution is not formed on the flat 14 after plating the flat 14. In particular, the width is set to substantially 0.1 mm.

Figure 6A:
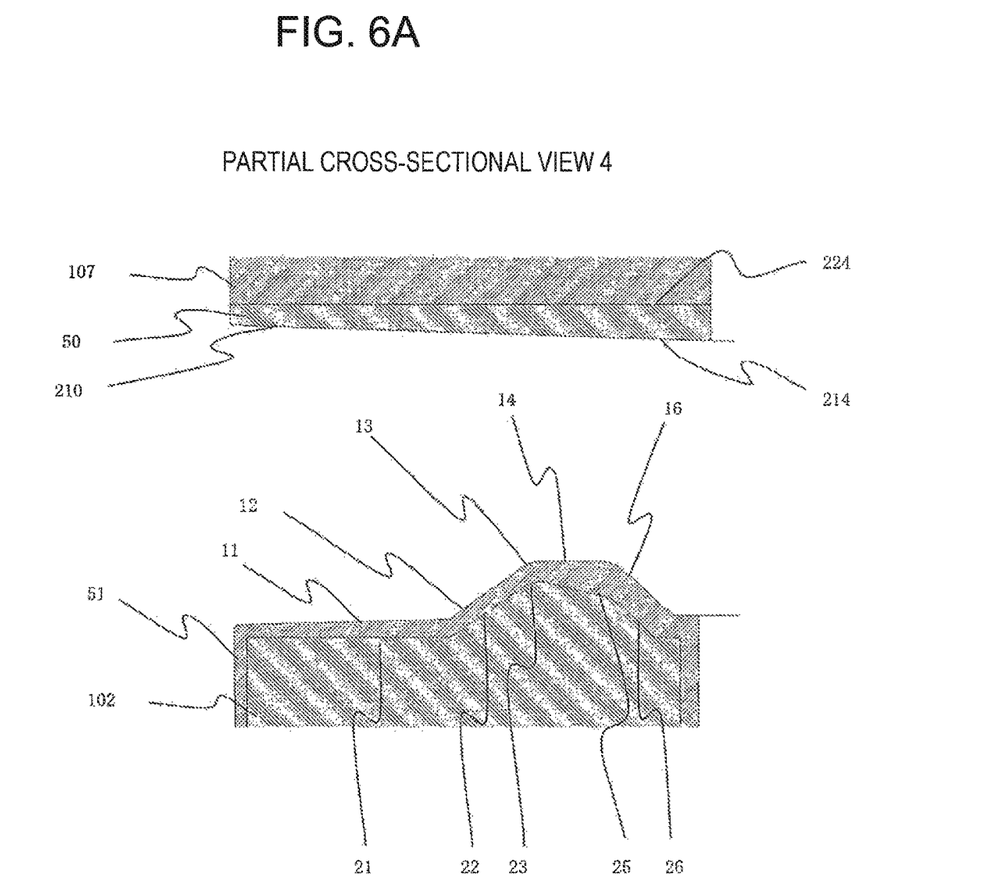
FIG. 6A is a partial cross-sectional view 4.

A second embodiment is described with reference to FIGS. 6(a) to 6(c). FIG. 6(a) shows a configuration in which the flat 24 is disappeared because the inner diameter taper 25 is shifted toward the outer peripheral side, while the R-shaped part 23 is completely remained. In this case, since the R-shaped part 13 and the flat part 14 are connected in a tangent manner after plating, even if the inclined angle θ is small, the occurred stress is suppressed.

Figure 6B:
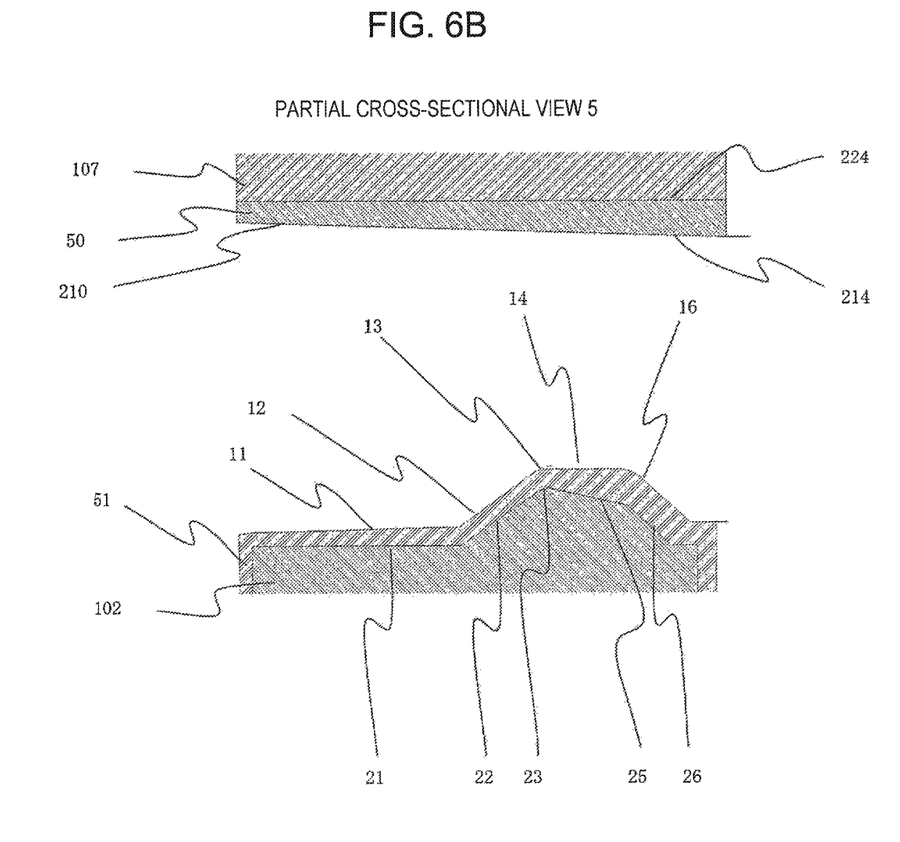
FIG. 6B is a partial cross-sectional view 5.
Figure 6C:
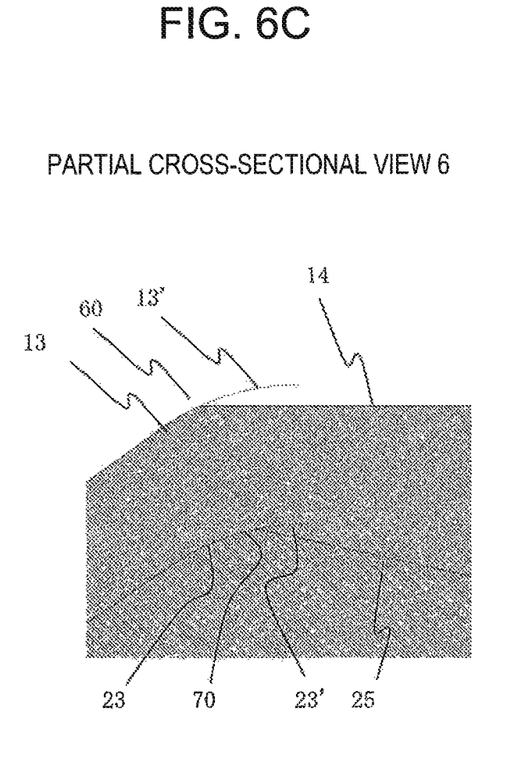
FIG. 6C is a partial cross-sectional view 6.

On the other hand, a configuration to which the present embodiment is not applied is described for the sake of explanation with reference to FIGS. 6(b) and 6(c). When the inner peripheral taper 25 is shifted toward the outer peripheral side (left side in figure) in a case in which the flat 24 is not formed, or when the inner per taper 25 is shifted toward the outer peripheral side beyond a region of the flat 24, as shown in FIG. 6(b), the R-shaped part 23 is not connected with the connecting part of the flat part 14 in a tangent manner because an R-shaped part 23' (shown by dotted line in figure) which is an extension line of the R-shaped part 23 does not exist, and therefore an edge shape part 70 is formed. As a result, after plating, the R-shaped part 13 is not connected with the connecting part of the flat part 14 in a tangent manner because an R-shaped part 13' (shown by dotted line in figure) which is an extension line of the R-shaped part 13 does not exist, and therefore an edge shape part 60 is formed. When the edge shape part 60 is contacted with the fixed core end surface 210, as corresponding to a case in which the size of R-shape is small in FIG. 5, high stress is occurred. In a case in which the collision load is large or the inclined angle θ is large, the edge shape part 60 might be worn or deformed.

Figure 7:
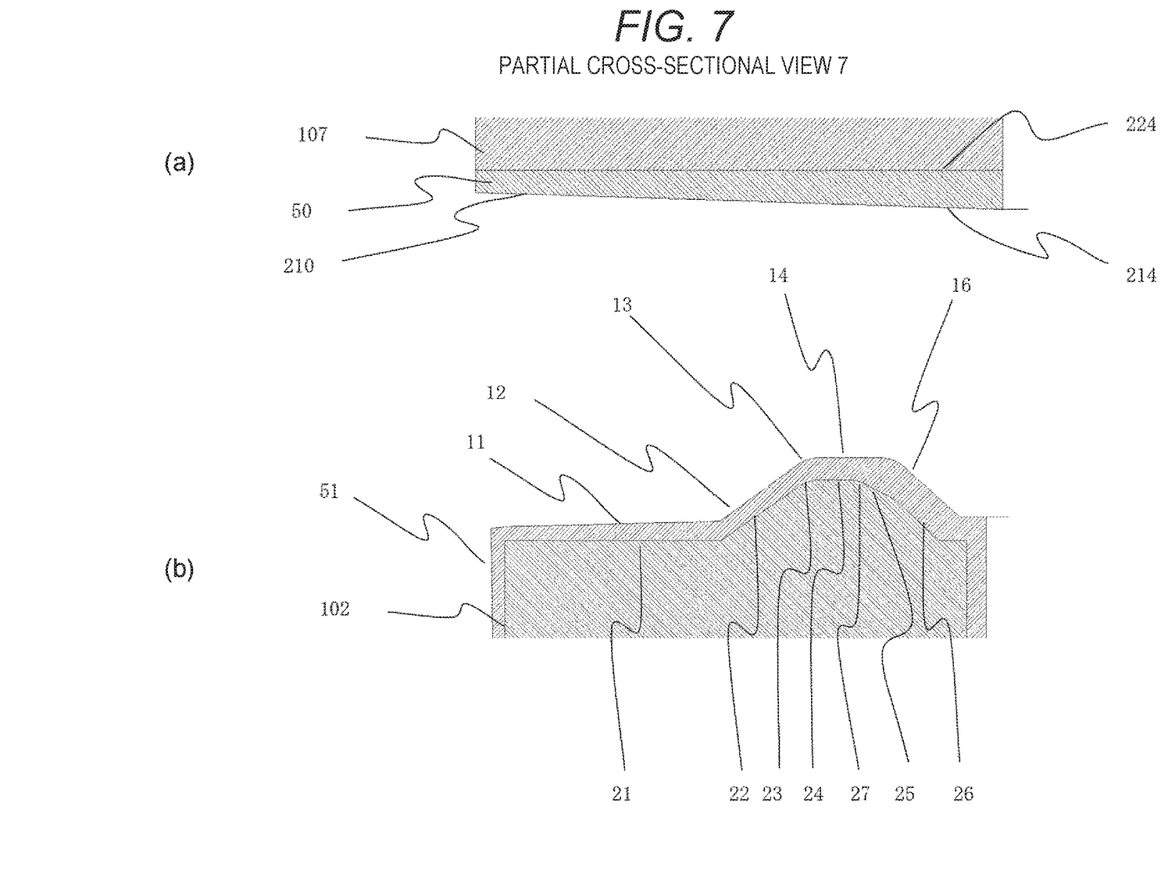
FIG. 7 is a partial cross-sectional view 7.

A third embodiment is described with reference to FIG. 7. In the third embodiment, an inner peripheral R-shaped part 27 is formed between the flat part 24 and the inner peripheral taper 25 compared to the configuration according to the first embodiment. The flat 24 and the inner peripheral R-shaped part 27 are connected in a tangent manner.

Here, if the connecting part of the flat 24 and the inner peripheral taper 25 is formed in an edge shape, the magnetic flux density is concentrated in plating and therefore the plating thickness might be large. When the plating thickness becomes partially large, a small projection is formed, and as a result, stress is concentrated and increased when colliding with the fixed core end surface 214.

Thus, in order to avoid a stress concentration, an extreme change of the plating thickness distribution is suppressed by providing the inner peripheral R-shaped part 27.

Figure 8:
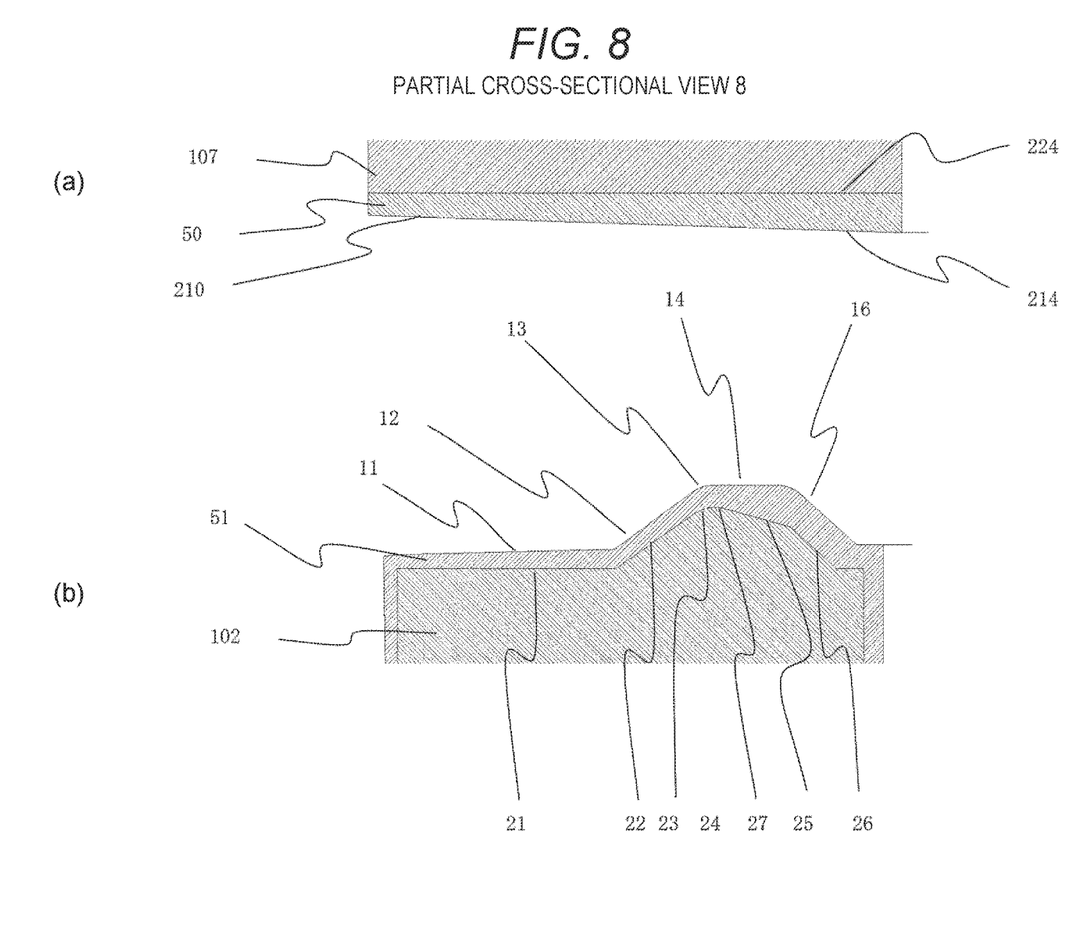
FIG. 8 is a partial cross-sectional view 8.

A fourth embodiment is described with reference to FIG. 8. It is described that the flat 24 is not formed because the inner diameter taper 25 is shifted toward the outer peripheral side while the R-shaped tart 23 is completely remained. In this case, similar to the example 3, in order to avoid a stress concentration, an extreme change of the plating thickness distribution is suppressed by providing the inner peripheral R-shaped part 27.

With the configuration described above, the stress occurred on the collision part, of the fixed core and the movable core can be reduced and the wear and the deformation can be suppressed.

Further, in the present embodiment, the projection 111 is formed on the movable core end surface 110, however a configuration in which a projection is formed on the fixed core side is similar.

The hard chrome plating is utilized as the surface treatment, however a configuration in which other surface treatment is utilized for forming a layer with a predetermined thickness is similar.

The whole configuration is described by using the electromagnetic fuel injection valve, however using other electromagnetic valve formed by a solenoid type switching valve is similar.

REFERENCE SIGNS LIST 210 fixed core end surface
214 fixed core end surface (collision part)

224 fixed core end surface (base material shape)
11 to 16 movable core end surface (after plating)
21 to 27 movable core end surface (before plating)
110 movable core end surface
111 projection on movable core end surface
60, 70 edge part
50, 51 hard chrome plating
54 adjusting element
55 spring
101 nozzle
102 movable core
103 housing
105 electromagnetic coil
107 fixed core
113 movable element guide
114 valve body
115 guide member
116 fixed valve
117 lateral, force
118 sphere
119 tip of movable element
121 reinforcing part
122 magnetic path
123 connector

The invention claimed is:

1. An electromagnetic valve, comprising:
a coil;
a valve body;
a projection part;
a fixed core; and
a movable core configured to open the valve body, wherein
a surface treatment having a predetermined thickness is disposed on each facing surface of the fixed core and the movable core,
an outer peripheral flat part, an outer peripheral taper part, an R-shaped part having a curved surface, a flat part, and an inner peripheral taper part are formed, in that order, from an outer peripheral side on the movable core,
the flat part is tangentially connected to the curved surface of the R-shaped part, and
a further taper part, which:
is immediately adjacent to the inner peripheral taper part,
is inclined at a larger angle than the inner peripheral taper part,
is provided at an inner diameter side of the inner peripheral taper part.

2. The electromagnetic valve according to claim 1, wherein thickness of a surface treatment layer on both or one of the fixed core and the movable core is formed to be larger toward a center side.

3. The electromagnetic valve according to claim 1, wherein a base material of the movable core before the surface treatment is applied includes an outer peripheral flat part, an outer peripheral taper part, an R-shaped part, and an inner peripheral taper part in order from an outer peripheral side.

4. The electromagnetic valve according to claim 3, wherein the R-shaped part and the inner peripheral taper part of the base material of the movable core before the surface treatment is applied are tangentially connected.

5. The electromagnetic valve according to claim 3, wherein the base material of the movable core before the surface treatment is applied includes a flat part between the R-shaped part and the inner peripheral taper part, and
the R-shaped part and the flat part of the base material are tangentially connected.

6. The electromagnetic valve according to claim 5, wherein the base material of the movable core before the surface treatment is applied includes an inner peripheral R-shaped part between the flat part and the inner peripheral taper part, and
the flat part and the inner peripheral R-shaped part of the base material are tangentially connected.

7. The electromagnetic valve according to claim 6, wherein components on the movable core are formed on the fixed core side.

8. The electromagnetic valve according to claim 7, wherein the surface treatment is a hard chrome plating defined by an electroplating.

* * * * *